June 25, 1935.　　　F. H. GULLIKSEN　　　2,005,893
CURRENT REGULATING SYSTEM
Filed July 7, 1932
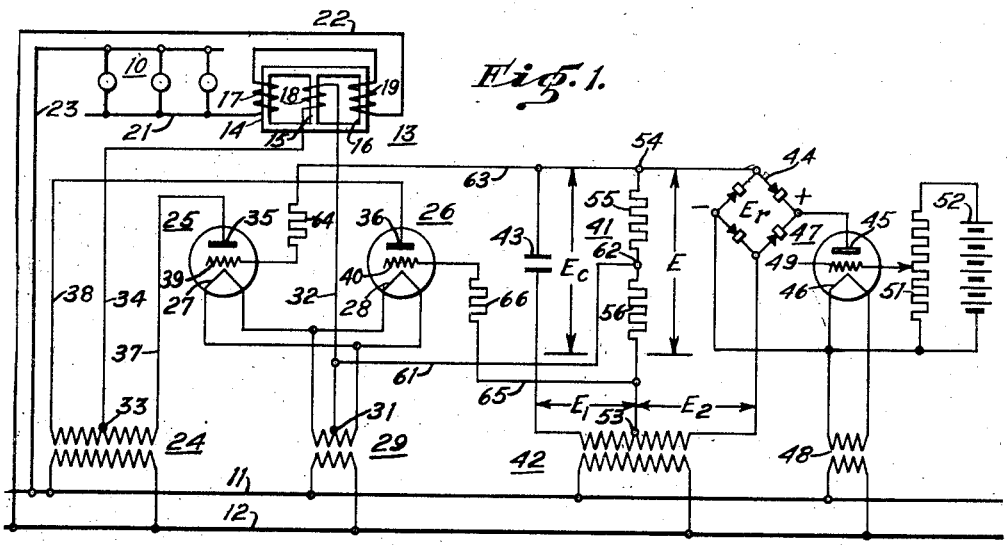
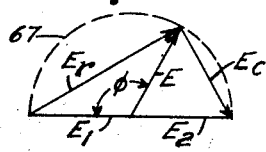
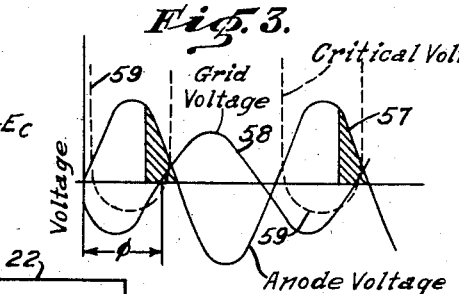
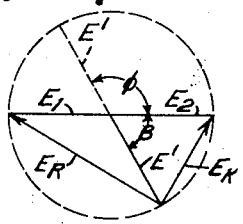
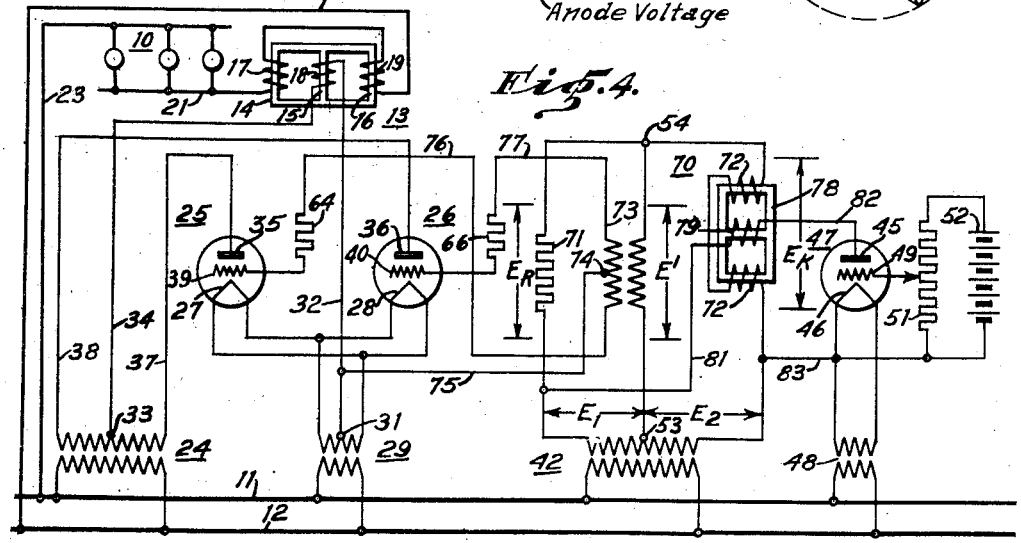
WITNESSES:
INVENTOR
Finn H. Gulliksen
ATTORNEY Patented June 25, 1935

2,005,893

UNITED STATES PATENT OFFICE 2,005,893

CURRENT REGULATING SYSTEM

Finn H. Gulliksen, Wilkinsburg, Pa., assignor to Westinghouse Electric & Manufacturing Company, East Pittsburgh, Pa., a corporation of Pennsylvania Application July 7, 1932, Serial No. 621,141

7 Claims. (Cl. 175—363)

My invention relates, generally, to current-regulating systems and, particularly, to systems wherein electronic tubes are utilized for controlling the flow of current through an electrical circuit.

It is well known in the art that electronic tubes of the three-electrode type, which are disposed in alternating-current circuits, may be controlled by shifting the phase position of the grid voltage with respect to the plate or anode voltage of the tube. However, previously known systems of varying the phase relation between the grid and anode voltage waves in order to vary the output of the tube produced a distortion of the wave form of the grid biasing voltage, which is undesirable when the tubes are utilized for certain applications, for instance to regulate the voltage of generators.

An object of my invention, generally stated, is to provide a system of phase-shift control for electronic tubes which shall be simple and efficient in operation and which may be economically manufactured and installed.

A more specific object of my invention is to prevent distortion of the wave form of the potential applied to the grid of an electronic tube to regulate the output of the tube.

Other objects of my invention will be explained fully hereinafter or will be apparent to those familiar with the art.

According to my invention the angle of phase displacement between the grid voltage and the plate voltage of electronic tubes, which are energized by alternating current, may be controlled by varying the load across the direct current terminals of a high-resistance full-wave rectifier unit that is connected in series-circuit relation with a capacitor. Inasmuch as a full wave rectifier is utilized, no higher harmonics are present in the system and, therefore, no wave form distortion is produced.

For a fuller understanding of the nature and scope of my invention, reference may be had to the folowing detailed description, taken in conjunction with the accompanying drawing in which:

Figure 1 is a diagrammatic view of apparatus and circuits connected in accordance with one form of my invention;

Fig. 2 is a vector diagram illustrating the action of the phase-shifting control system shown in Fig. 1;

Fig. 3 is a diagram of curves showing the effect of varying the phase relation of the grid voltage and the anode voltage applied to a grid-glow tube;

Fig. 4 is a diagrammatic view of apparatus and circuits connected in accordance with another form of my invention; and Fig. 5 is a vector diagram illustrating the action of the phase-shifting control system shown in Fig. 4.

Referring now to the drawing, and particularly to Fig. 1, a lighting circuit 10 is supplied with current from alternating-current power conductors 11 and 12, and the voltage of the current is controlled by a reactor 13 having three cores 14, 15 and 16 having windings 17, 18 and 19 wound thereabout, respectively.

The windings 17 and 19 are connected in series-circuit relation and are connected in the lamp circuit 10 by means of conductors 21 and 22, the latter being connected to the feed conductor 12. The conductor 21 connects one side of the lamp circuit 10 to the winding 17 and the other side of the lamp circuit is connected to the feed conductor 11 by conductor 23.

The winding 18, which is the control winding of the reactor 13, is supplied with unidirectional current which varies the magnetic flux of the core of the reactor in response to variations in the current through the control winding, thereby regulating the voltage of the windings 17 and 19 in a well-known manner.

Rectified current is supplied to the control winding 18 from a transformer 24, having a primary winding that is energized by the power conductors 11 and 12, through the medium of two hot-cathode grid-glow tubes 25 and 26 which are connected in "push-pull" relation.

The filaments or cathodes 27 and 28 of the tubes 25 and 26, respectively, are energized by the secondary winding of transformer 29, the primary winding of which is connected across the power conductors 11 and 12. One terminal of the control winding 18, of the reactor 13, is connected to a mid-tap 31 of the transformer 29 by a conductor 32. The other terminal of the winding 18 is connected to a mid-tap 33 of the transformer 24 by a conductor 34 and the plates or anodes 35 and 36 of the tubes 25 and 26 are connected to end terminals of the transformer 24 by conductors 37 and 38, respectively.

Since each of the tubes possesses the well known characteristic of passing current in one direction only, from anode to cathode, current passage can take place only during the positive half cycle when the tubes are energized from an alternating-current source. Thus, when connected as shown in Fig. 1, the tube 25 passes current through the control winding 18 during one half of the alternating-current cycle, and the tube 26 similarly passes current through the winding 18 during the other half of the cycle, thereby effecting a full-wave rectification.

The portion of the positive half cycle during which conduction of current takes place, and hence the effective current passed, may be regulated by suitably modifying the control potential impressed upon the grid elements 39 and 40 of the respective tubes 25 and 26. As previously stated, grid-glow tubes which are disposed in alternating-current circuits may be controlled by a method commonly known as the "phase-shift" method in which an alternating current potential of substantially constant magnitude is impressed upon the grid circuit but the phase position of the grid potential with respect to the plate potential may be varied. My invention resides in providing an improved method of "phase-shift" control, as hereinafter described.

As illustrated, a control-potential bridge circuit 41, comprising a capacitor 43 and a rectifier 44, is energized from the power conductors 11 and 12 through a transformer 42. The capacitor 43 and the rectifier unit 44 are connected in series-circuit relation across the terminals of the secondary winding of the transformer 42. The rectifier 44 may be of any suitable type such as the well known metallic-oxide full-wave rectifier. The positive and negative output terminals of the rectifier are respectively connected to the anode and cathode elements 45 and 46 of a vacuum tube 47.

The cathode or filament element 46 of the tube 47 is supplied with heating current from a transformer 48 which is energized by the power conductors 11 and 12. As shown, a biasing potential may be impressed upon the grid 49 by means of a potentiometer resistor 51 and a battery 52.

The control potentials for the grid-glow tubes 25 and 26, derived from the bridge circuit 41 are caused to be dependent upon the voltage acting between a mid-tap connection 53 of the secondary winding of the transformer 42 and a connection 54 that is common to the capacitor 43 and the rectifier 44. As illustrated in Fig. 1, this is accomplished by disposing in series-circuit relation between these two points in the bridge circuit, two resistors 55 and and 56, and connecting these resistors with the grid and cathode elements of the grid-glow tubes 25 and 26 in the manner shown. It will be understood that, should it be desired, a grid transformer may be utilized instead of the resistors shown to accomplish the same result.

The voltage of transformer 42 acting upon the capacitor 43 and the rectifier 44 connected in series-circuit relation produces in these elements potential drops having some such phase relation as is illustrated by the vector diagram of Fig. 2. In this diagram, vectors $E_1$ and $E_2$ indicate the voltages acting in the two sections of the transformer secondary winding, vector $E_r$ and $E_c$ indicate the voltage drops occurring in the rectifier and the capacitor units, respectively, and vector E designates the voltage acting between points 53 and 54 of the bridge circuit 41 or upon resistor elements 55 and 56 in series.

At a given position of the arm of the potentiometer 51, the phase position of vector E, with respect to the power-source voltage, is of some intermediate value, such as indicated in Fig. 2, by the angle theta. In the diagram of curves of Fig. 3, in which curve 57 designates the voltage impressed upon the anode element of either of the grid-glow tubes, and curve 58 the control potential impressed upon the grid element of the tubes, theta designates the angular displacement between these two potential curves.

Before a grid-glow tube can conduct current through its major element circuit, it is necessary that the control grid element be maintained at a potential in excess of some given critical value. Such a series of minimum or critical values of grid voltage, is represented in Fig. 3 by a curve 59. If a negative bias be maintained on the grid in excess of a given series of values throughout the cycle, no current conduction between the major elements can take place. However, if this negative grid-bias voltage falls below the critical value indicated by curve 59, conduction will take place from that point during the remainder of the positive half cycle, consequently, when the displacement of the grid voltage is equal to the angle theta, current conduction from anode to cathode of the tube will result during the shaded portion of the positive-half cycle. It will be apparent that the starting point of such conduction may be changed by shifting the phase position of the control potential.

During the half cycle of the alternating-current supply voltage in which the right-hand terminal of the secondary winding of the transformer 24 is positive with respect to the left-hand terminal, an energizing current for the control winding 18 of the reactor 13 may be permitted to flow through a circuit which extends from the right-hand terminal of transformer 24 through conductor 37, the anode and cathode elements 35 and 27 of grid-glow tube 25, the mid-tap connection 31 of transformer 29, conductor 32, the winding 18, and conductor 34 back to the mid-tap connection 33 of the transformer 24.

Likewise, during the half of the alternating-current cycle when the left-hand terminal of the transformer 24 is positive with respect to the right-hand terminal, an energizing current for the control winding 18 may be permitted to flow through grid-glow tube 26 through a circuit which extends from the left-hand terminal of the secondary winding of transformer 24 through conductor 38, the anode and cathode elements 36 and 28 of grid-glow tube 26, mid-tap connection 31 of transformer 29, conductor 32, the winding 18, and conductor 34 back to mid-tap connection 33 of the transformer 24.

In the system shown in Fig. 1, the control potentials for the tubes 25 and 26 are impressed upon the grid elements through a circuit which includes, for the tube 25, the cathode element 27, mid-tap connection 31, conductors 32 and 61, mid-point 62 of the series-connected resistors 55 and 56, resistor 55, conductor 63 and grid resistor 64 back to grid element 39. For the tube 26, the circuit extends from the cathode element 28 through transformer tap 31, conductors 32 and 61, midpoint 62 of the series-connected resistors 55 and 56, resistor 56, conductor 65 and a grid resistor 66 back to grid-element 40.

For a predetermined biasing potential on the grid circuit of the vacuum tube 47, the phase position of the control potential impressed upon the grid elements of the grid-glow tubes 25 and 26 is such that the effective current which the tubes pass through the control winding of the reactor 13 is of a value sufficient to maintain a predetermined voltage on the lamp circuit 10.

If it is desired to vary the voltage on the lamp circuit, the negative bias of the grid element 49 of the tube 47 may be reduced by adjusting the potentiometer 51, thereby lowering the impedance of the tube and, consequently, decreasing the effective resistance of the rectifier 44. This lowers the total impedance of the bridge circuit 41, increases the current through the series-connected capacitor 43 and rectifier 44, thereby increasing the voltage drop across the condenser, designated in Fig. 2 by $E_c$, and decreasing the voltage drop across the rectifier 44, designated by vector $E_r$.

Since these last-named vectors are always displaced from one another by an angle of substantially 90 degrees, as shown, and since the total impressed voltage, given by the sum of vectors $E_1$ and $E_2$, remains unchanged, the intersection of vectors $E_r$ and $E_c$ will be caused to move along a path which forms a semi-circle 67 drawn upon $E_1$ and $E_2$ as the diameter.

Hence, when vector $E_c$ is lengthened and $E_r$ is shortened, vector $E$ will be rotated in a counter-clockwise direction to a new position in which the displacement angle theta is of a smaller value than that shown. Reference to the curves of Fig. 3 will show that as angle theta is decreased, the point of intersection of grid-voltage curve 58 with critical-voltage curve 59, will be moved to the left and current conduction by the grid-glow tube will start at an earlier period in the positive half cycle. Such being the case, the effective current passed through the control winding 18 of the reactor 13 will be raised, and the voltage of the lamp circuit 10 will be correspondingly increased.

In a similar manner, if the negative bias impressed upon the grid 49 of vacuum tube 47 is raised, the tube impedance will likewise be increased and the effective resistance of rectifier unit 44 will be raised. This action raises the impedance of the phase-shifting bridge circuit and decreases the current therein, thereby causing the voltage drop across the capacitor 43 to decrease and the voltage drop across the rectifier to increase.

Reference to Fig. 2 will reveal that such a shortening of vector $E_c$ and a lengthening of vector $E_r$ causes vector $E$ to be rotated in a clockwise direction to a position in which the displacement angle theta is of a higher value. Such a higher displacement angle means that control potential curve 58 will be moved to the right in Fig. 3 to be further out of phase with anode voltage curve 57, and as a result the current conduction of the grid-glow tubes will start at a later point during each positive half cycle. Such being the case, the effective value of the current in the control winding 18 will be lowered and the voltage on the lamp circuit 10 will be correspondingly decreased.

The phase-shifting bridge of the embodiment of my invention shown in Fig. 1 utilizes, as has been explained, a capacitor connected in series with an adjustable effective resistance unit. This particular arrangement possesses the advantage of providing a distortionless shift of grid potential, a feature which is found to be particularly desirable in voltage regulating applications, such as are disclosed in my copending application Serial Number 568,537, filed October 13, 1931 and assigned to the same assignee as this invention. While this is perhaps the most satisfactory method of attaining grid-potential control, I have found that other types of phase-shifting bridge circuits may be utilized in the system of my invention, as for example, one which comprises a fixed resistor connected in series with an adjustable reactance for energization from the alternating-current source of power.

In Fig. 4, the control winding 18 of the reactor 13 is energized from the alternating-current power conductors 11 and 12 through a grid-glow tube rectifying circuit which is shown as being identical with that already explained in connection with Fig. 1. A modification of the phase-shifting bridge circuit previously described is interposed between the vacuum tube 47 and the grid-glow tubes 25 and 26.

As illustrated, this bridge circuit comprises a resistor 71 connected in series with the windings 72 of an adjustable reactance device 70, for energization by the secondary winding of the transformer 42, the primary winding of which is connected across the power conductors 11 and 12. The primary winding of a grid-potential transformer 73 is connected for energization by the voltage between the mid-tap connection 53 of the transformer 42 and the connection 54 which joins the resistor 71 with the adjustable reactance windings 72.

The transformer 73 is utilized to couple the bridge circuit with the control elements of the grid-glow tubes. The secondary winding of this transformer is provided with a mid-tap connection 74 which is joined by means of conductor 75 to cathode elements 27 and 28 of grid-glow tubes 25 and 26, and the two ends of this winding are respectively connected to the grid elements 39 and 40 of the grid-glow tubes by means of conductors 76 and 77.

The windings 72, mentioned, form a part of an adjustable reactance device 70, similar to the reactor 13, they being associated with a magnetically-saturable core member 78 which is provided with an exciting winding 79. The passage of direct current through the winding 79 causes the reactor core 78 to become saturated and thus reduces the effective reactance of winding 72.

The exciting current for the winding 79, may be supplied from any suitable source, such as from a transformer 42 through a circuit which includes the major elements 45 and 46 of the vacuum tube 47. The tube 47 functions in a well known manner to rectify the alternating-current impressed upon this circuit and to control the magnitude of the resulting pulsating-direct current in exciting the winding 79 in accordance with the control potential impressed upon grid element 49 of the tube 47.

As in the case of the system shown in Fig. 1, the potential impressed upon grid element 49 of the tube 47 may normally be of a small negative value. For this condition, an intermediate value of exciting current is allowed to flow through the winding 79 of the bridge-circuit reactor through a circuit which extends from the left-hand terminal of the secondary winding of the transformer 42 through conductor 81, the winding 79, conductor 82, anode and cathode elements 45 and 46 of the tube 47 and conductor 83 back to the right-hand terminal of the transformer 42.

This value of exciting current causes windings 72 of the reactor to offer some such intermediate value of reactance to the flow of alternating-current that the voltage drop across the windings, caused by the energization from transformer 42 through resistor 71, is of a value represented in the vector diagram of Fig. 5 by vector $E_k$.

In Fig. 5, as in Fig. 2 previously described, vectors $E_1$ and $E_2$ designate the bridge circuit energizing voltages supplied by transformer 42. For the conditions assumed, resistor 71 will have a voltage drop therein given by vector $E_R$ which bears a 90 degree phase relation with respect to the inductive circuit vector $E_k$. The voltage acting upon transformer 73 is designated by E', which voltage for the particular conditions assumed, has a phase displacement with respect to the power-circuit voltage of a value designated by angle beta. It will thus be seen that the control potential impressed upon the grid elements of the grid-glow tubes 25 and 26 is dependent for its phase position upon voltage E', which in turn may be controlled by the biasing potential impressed upon the grid element 49 of the tube 47.

A decrease in the value of the negative bias impressed upon grid 49 increases the current passed by the tube through exciting winding 79 of the bridge-circuit reactor and further saturates reactor core 78, thereby lowering the reactance of the windings 72. This decreases the total impedance of the bridge circuit and the current through resistor 71 and reactor windings 72 is accordingly increased and the voltage drop across the resistor, indicated by vector $E_R$, is raised, while the voltage drop across the reactor windings, indicated by vector $E_k$, is lowered. The lengthening of vector $E_R$ and the shortening of vector $E_k$ causes vector E' to be rotated in a counter-clockwise direction to decrease the value of displacement angle beta.

The connections of transformer 73 with the grid elements of grid-glow tubes 25 and 26 are such that a decrease in the angle beta, which is the equivalent of an increase in the angle theta in Fig. 5, effects a shift of grid-control potential, which is represented by vector E' because of crossing of grid conductors 76 and 77, in Fig. 4 in such a direction that the current in the control winding 18 of the reactor 13 is caused to be raised.

It will be apparent that an increase in the biasing potential impressed upon the grid 49 of the tube 47 produces effects opposite to those given for the action resulting from a decrease in the biasing potential. The voltage on the lighting circuit 10 may, therefore, be controlled at will by adjusting the potentiometer 51.

While I have illustrated by phase-shifting control system as being applicable for controlling the voltage applied to lighting systems, as for instance theatre lighting circuits, it is evident that the system herein disclosed may also be utilized to advantage in generator voltage regulating systems to control the voltage of generators, in motor control systems to control the speed of the motors, and for other uses.

I, therefore, do not desire to be restricted to the particular embodiments of my invention herein shown and described, since it is evident that they may be changed and modified without departing from the spirit and scope of my invention as defined by the appended claims.

I claim as my invention:

1. In a current-regulating system, in combination, an alternating-current power source, current rectifying and control means energized from said power source and comprising a pair of electronic tubes having grid control elements, a phase-shifting bridge comprising a capacitor and a full-wave rectifier energized from said power source and disposed to impress an alternating-current control potential upon said grid elements, and means associated with said bridge circuit for varying the conductivity of the rectifier, thereby varying the phase positions of said control potentials with respect to the potential of said power source to control the effective current passed by the electronic tubes.

2. In a current-regulating system, in combination, an alternating-current power source, current-rectifying and control means energized from said power source and comprising a grid-glow tube electron-discharge device having a grid element, a phase-shifting bridge circuit comprising a transformer winding energized from said alternating-current source and disposed to energize a capacitor connected in series with a full-wave rectifier unit the output terminals of which are connected to the anode and cathode elements of a triode vacuum tube, means for varying the biasing potential impressed on the grid element of said vacuum tube to vary the effective resistance of the rectifier unit, and means for impressing upon the control element of said grid-glow tube a potential derived from said bridge circuit between an intermediate point in the said transformer winding and the connection joining the said capacitor with the said rectifier unit, thereby controlling the effective current passed by the grid glow tube.

3. In a current-regulating system, in combination, an alternating-current power source, current-rectifying means disposed to pass current from the alternating-current power source, grid-element means associated with said rectifying means for controlling the current passed by the rectifying means in accordance with the phase position of an alternating-current control potential impressed thereon, and means for shifting the phase position of said control-potential with respect to the voltage of the power source comprising a transformer winding energized from said power source, a capacitor and a full-wave rectifier unit connected in series for energization from said winding, a vacuum tube having anode and cathode elements connected to the output terminals of said rectifier and means for varying the biasing potential impressed upon the grid element of said vacuum tube to vary the effective resistance of the rectifier unit, the control potential impressed upon the said grid-element means of the rectifying means being derived from the voltage acting between an intermediate point in the said transformer winding and the connection joining the said rectifier unit and the capacitor.

4. In a current regulating system, in combination, an alternating-current power source, current-rectifying means energized from said power source and comprising electronic tubes having anode and cathode elements and control grid elements, a phase-shifting bridge circuit including a full-wave rectifier and a capacitor energized from said power source and disposed to impress an alternating-current control potential upon said grid elements, and means associated with said bridge for varying the effective resistance of the rectifier, thereby varying the phase position of said control potential with respect to the potential of said power source to regulate the effective current passed by said current-rectifying means.

5. In a current regulating system, in combination, an alternating-current power source, current-rectifying means energized from said power source and comprising a pair of grid-glow tube electron-discharge devices each having a grid element, a phase-shifting bridge circuit comprising a capacitor and a full-wave rectifier energized from said power source and disposed to impress a control potential upon said grid elements, and means associated with said bridge circuit for varying the effective resistance of the rectifier, thereby varying the phase positions of said control potentials with respect to the potential of said power source to regulate the effective current passed by said grid-glow tubes.

6. In a current-regulating system, in combination, an alternating-current power source, current rectifying and control means energized from said power source and comprising a pair of electronic tubes having grid control elements, a phase-shifting bridge comprising a capacitor and a full-wave rectifier disposed to impress a control potential upon said grid control elements, and means for controlling the output current of the rectifier to vary its effective resistance, thereby varying the phase position of said control potential with respect to the potential of said power source.

7. In a current-regulating system, in combination, an alternating-current power source, current rectifying and control means energized from said power source and comprising a pair of electronic tubes having grid control elements, a phase-shifting bridge comprising a capacitor and a full-wave rectifier disposed to impress a control potential upon said grid control elements, thermionic tube means for controlling the output current of the rectifier to vary its effective resistance, and means for varying the control potential impressed upon said tube to control the current passed by the tube.

F. H. GULLIKSEN.